United States Patent [19]

Ivanchev et al.

[11] 4,342,676
[45] Aug. 3, 1982

[54] METHOD FOR PRODUCING LATICES OF COPOLYMERS OF BUTYL ACRYLATE AND 1-METHACRYLATE-1-TERT-BUTYL PEROXY ETHANE

[76] Inventors: Sergei S. Ivanchev, ulitsa Nalichnaya, 36/3, kv. 97; Valery N. Pavljuchenko, prospekt Energetikov, 34, kv. 53; Zinaida M. Pessina, ulitsa Pskovskaya, 6, kv. 12; Elena D. Vasilieva, prospekt Lunacharskogo, 110, kv. 324, all of Leningrad, U.S.S.R.

[21] Appl. No.: 216,994

[22] PCT Filed: Mar. 13, 1979

[86] PCT No.: PCT/SU79/00016
§ 371 Date: Nov. 13, 1980
§ 102(e) Date: Nov. 10, 1980

[87] PCT Pub. No.: WO80/01917
PCT Pub. Date: Sep. 18, 1980

[51] Int. Cl.³ .............................. C08L 00/00
[52] U.S. Cl. .................. 524/458; 525/298; 525/902; 526/87; 526/232.5; 526/328.5; 524/833
[58] Field of Search ............... 260/29.6 MQ, 29.6 RB; 525/298, 902; 526/87, 232.5, 328.5

[56] References Cited

U.S. PATENT DOCUMENTS

| | | | |
|---|---|---|---|
| 3,242,121 | 3/1966 | Hill, Jr. | 260/29.6 |
| 3,297,666 | 1/1967 | MacPherson | 260/80.5 |
| 3,745,196 | 7/1973 | Lane et al. | 260/881 |
| 4,045,463 | 8/1977 | Matsuyama et al. | 260/453 RZ |

*Primary Examiner*—Joseph L. Schofer
*Assistant Examiner*—Bernard Lipman
*Attorney, Agent, or Firm*—Lilling & Greenspan

[57] ABSTRACT

A method for producing latices of copolymers of butyl acrylate and 1-methyacrylate-1-tert-butyl peroxy ethane resides in the emulsion copolymerization of butyl acrylate and 1-methacrylate-1-tert-butyl peroxy ethane carried out by prepolymerizing of butyl acrylate up to a conversion degree of 90-100% followed by introducing 1-methacrylate-1-tert-butyl peroxy ethane into the reaction mass. For a redox system, use is made of potassium persulfate and sodium metabisulfate.

2 Claims, No Drawings

METHOD FOR PRODUCING LATICES OF COPOLYMERS OF BUTYL ACRYLATE AND 1-METHACRYLATE-1-TERT-BUTYL PEROXY ETHANE

FIELD OF THE INVENTION

The present invention relates to the production of latices of reactive rubbers, and more particularly to a method for producing latices of copolymers of butyl acrylate and 1-methacrylate-1-tert-butyl peroxy ethane. Said compounds can be used to obtain shockproof weather-resistant copolymers and graft comb-shaped styrene copolymers as well. Moreover, the reactive alkyl acrylate rubbers may find extensive application in the production of oil- and ozone-resistant vulcanized rubbers, the vulcanization of the rubbers can therewith be carried out with no special vulcanizing agents added.

BACKGROUND OF THE INVENTION

Known in the art is a method for producing reactive peroxidized copolymers by means of mass copolymerization or suspension copolymerization of vinyl monomers with perester acrylates (cf. USSR Inventor's Certificate No. 170,675 published in Bulletin "Otkrytia, izobretenia, promyshlennye obraztsy i tovarnye znaki", No 9, 1965, p. 69). According to this method, 1-10% of monomeric peroxide is added to vinyl monomer and the reaction mixture is heated in autoclaves at a temperature ranging from 40° to 100° C. The copolymer formed comprises 0.1-3% of the peroxidic groups. The copolymers obtained according to this method have low reactivity due to a small content of the peroxidic groups therein because of their decomposition during synthesis of the copolymers. In further use of said copolymers to obtain graft copolymers, their low reactivity fails to provide the grafting extent required.

Also known in the art is a method for producing reactive latices by means of copolymerization of vinyl monomers with butyl-2-acrylate-ethyl peroxide (cf. a paper by Puchin V. A. et al. Syntaz perekisnosoderzhashikh divinylstyrolnikh sopolymerof v emulsiyakh. Visokomoleculijrnie soedineniij. AII, 1969, No. 4, pp. 789-793). By this method, the copolymerization of vinyl monomers with peroxidic monomer (in amount of 1-5 mole, %) is carried out in an emulsion stabilized with ammonium cetyl trimethyl bromide at temperatures of from 10° to 50° C. The copolymer formed comprises 0.1-2% of the peroxidic units.

The copolymers obtained according to this method have low reactivity due to a small content of the peroxidic groups in the copolymers.

Known in the art is a method for producing latices of reactive alkyl acrylate rubbers by means of emulsion copolymerization of alkyl acrylate with a bifunctional acrylic monomer, such as β-chloroethyl methacrylate or glycidyl methacrylate (cf. USSR Inventor's Certificate No. 254,770 published in Bulletin "Otkrytia, izobretenia, promyshlennye obraztsy i tovarnye znaki", No. 32, 1969, p. 81). Copolymerization of styrene, butyl acrylate and β-chloroethyl methacrylate is carried out in emulsion at a ratio of the water phase to the hydrocarbon phase of 2:1 or 4:1, in the presence of an emulsifier, such as sodium alkyl sulfonate, and a redox system at a reaction temperature of from 30° to 70° C. In 2-2.5 hours, conversion of the monomers amounts to 95-98%.

Introduction of β-chloroethyl methacrylate units into macrochains of the butyl acrylate rubber causes rapid aging of these rubbers. According to this method, grafting to the butyl acrylate rubber containing chlorine atoms occurs due to the chain transfer reaction as a result of the separation of the chlorine atom. However, low efficiency of this reaction results in inadequate grafting of vinyl monomers to the butyl acrylate rubber.

There is known a method for producing latices of alkyl acrylate rubbers used primarily in synthesizing shock-proof copolymers based on vinyl monomers (cf. USSR Inventor's Certificate No. 447,050 published in Bulletin "Otkrytia, izobretenia, promyshlennye obraztsy i tovarnye znaki", No. 31, 1976, p. 177). By this method, rubber latices are prepared by emulsion copolymerization of acrylic monomers with 1-(α-alkyl acrylate)-1-tertbutyl peroxy ethanes in the presence of water soluble emulsifiers and a reversible initiating redox system consisting of isopropyl benzene hydroperoxide, Rongalite ®, and Trilon B ®, the components all being simultaneously introduced into the reactor.

As a result of the copolymerization, there are formed alkyl acrylate rubber latices having peroxidic side groups capable of grafting vinyl monomers.

The exothermal nature of the copolymerization of the above method (which increases the temperature up to 50°-60° C.) results in decomposition of the peroxidic groups during the latex synthesis up to 25%, which requires additional heat-removal.

The rubber latex, produced in accordance with the above method, exhibits low stability stored, manifesting itself in decomposition of the peroxidic groups entering into the structure of the rubber, and decreases the further ability of the rubber to graft vinyl monomers. Due to such a feature, the latex cannot be used but immediately after its synthesis.

A high rate of copolymerization in accordance with the above-mentioned method, namely the copolymer yield in 15 minutes amounts to 70-80%, makes it difficult to control dispersity of the latex being formed.

These disadvantages manifest themselves particularly in the cases, when the most available peroxidic monomer, i.e. 1-methacrylate-1-tert-butyl peroxy ethane is used as 1-(α-alkyl acrylate)-1-tert-butyl peroxy ethane.

SUMMARY OF THE INVENTION

The principal object of the present invention is to provide through a change in the sequence of the process steps and by a proper selection of the initiating redox system, a high quality end product which is stable in storage by obviating decomposition of the peroxidic groups entering into the copolymer structure.

With this principal object in view, there is provided a method for producing a latex of the copolymer of butyl acrylate and 1-methacrylate-1-tert-butyl peroxy ethane by emulsion copolymerization of butyl acrylate and 1-methacrylate-1-tert-butyl peroxyethane in the presence of an initiating redox system. According to the invention, the copolymerization is carried out through prepolymerization of butyl acrylate to a conversion degree of 90-100% followed by introducing 1-methacrylate-1-tert-butyl peroxy ethane into the reaction mass, potassium persulfate and sodium metabisulfite being used as the initiating redox system.

It is expedient to introduce the initial monomers stepwise to adjust the latex particle diameter.

Best Mode for Carrying out the Invention

The proposed method for producing a latex of the copolymer of butyl acrylate and 1-methacrylate-1-tert-butyl peroxy ethane is carried out as follows.

The emulsion copolymerization of the initial monomers is carried out in a reaction vessel thermostated at 20° C. and provided with a stirrer, return condenser, and an inert gas feeding tube. pH of the reaction mixture is maintained within the range of 7.5–9.0.

For emulsifiers, use is made of surface-active anionogens, for example sodium salts of fatty sulfacids (alkyl sulfonates having hydrocarbon radicals of $C_{12}H_{25}$ to $C_{18}H_{37}$).

The reactive vessel is charged with water, emulsifier, pH-adjuster, namely borax ($Na_2B_4O_7.10\ H_2O$).

Upon dissolution of the emulsifier and borax in the reaction vessel, there is introduced, under stirring, butyl acrylate followed by emulsification and purging the reactive mixture with an inert gas for 10 minutes. Next, there are introduced the components of the initiating system, namely potassium persulfate and sodium metabisulfite, and the reaction proceeds with a continuous flow of the inert gas. In four hours after the start of the reaction (from the moment of introducing the initiating system) when 90–100% of the butyl acrylate is converted, the second portion of the monomeric mixture consisting of butyl acrylate and 1-methacrylate-1-tert-butyl peroxy ethane is introduced. In five hours from the start of the reaction the third portion of the monomeric mixture similar to the second portion is added. To permit adjustment of the latex particle diameter, adding of the butyl acrylate can be performed stepwise with small portions. In six hours the reaction is completed.

The proposed method exhibits a number of advantages as compared to the known methods.

The proposed method, due to introducing the peroxidic comonomer at successive stages of the reaction, and hence, due to its decreased exposure in the reaction zone, ensures practically complete retention of the peroxidic groups in the rubber obtained.

Said method results in a concentrating of the peroxidic groups in the surface zone of the latex particle, which increases the efficiency of grafting vinyl monomers on to the rubber particle, when synthesizing shockproof copolymers.

When synthesizing latices, the use of the initiating redox system of potassium persulfate $K_2S_2O_8$ and sodium metabisulfite $Na_2S_2O_5$ in conjunction with successive introduction of the reaction mixture components, makes it possible to readily adjust the reaction rate, preventing the temperature increase on the stages of introducing the peroxidic copolymer above 25° C.

The possibility of varying the order of introducing the components enables adjustment of the latex particle size over a wide range (0.05–0.25 micron), the latices formed having a high aggregative stability despite the use of small amounts of the emulsifier.

The latices obtained by this method enjoy high stability manifesting itself in that practically no decomposition of the peroxidic groups occurs during long-term storage of the latex at room temperature.

Characteristic examples illustrative of the implementation of the proposed method for producing a latex of the copolymer of butyl acrylate and 1-methacrylate-1-tert-butyl peroxy ethane according to the present invention are given below.

EXAMPLE I 500 g of water (110 parts by weight), 7.5 g (1.66 parts by weight) of the mixture of alkyl sulfonates having a hydrocarbon radical of $C_{12}H_{37}$ to $C_{18}H_{37}$, 1.90 g (0.42 parts by weight) of borax ($Na_2B_4O_7.10\ H_2O$) are introducted into a reaction vessel thermostated at 20° C. and provided with a stirrer, a return condenser, and an inert gas feeding tube.

Upon dissolution of the emulsifier and borax, the reactor is charged, under stirring, with 360 g (79.6 parts by weight) of butyl acrylate, followed by emulsification and purging of the reaction mixture with an inert gas for 10 minutes. Next, the components of the initiating system are introduced, namely 1.56 g (0.34 part by weight) of a potassium persulfate and 0.729 g (0.16 part by weight) of sodium metabisulfite, the reaction being carried out in a flow of the inert gas. In four hours from the start of the reaction (from the moment of introducing the initiating system), upon 90% conversion of the butyl acrylate introduced 22 g (4.9 parts by weight) of butyl acrylate and 24 g (5.3 parts by weight) of 1-methacrylate-1-tert-butyl peroxyethane are added. In five hours from the start of the reaction, another 22 g (4.9 parts by weight) of butyl acrylate and 24 g (5.3 parts by weight) of 1-methacrylate-1-tert-butyl peroxy ethane are added. In six hours the reaction is completed.

The resulting latex of copolymer of butyl acrylate and 1-methacrylate-1-tert-butyl peroxy ethane has the following characteristics:
dry residue 44% of the latex mass
average particle diameter 0.055 μm
content of the peroxidic monomer units in the copolymer 9.9% by weight.

When storing the latex at room temperature for 30 days no change in the content of the active oxygen occurs, which is indicative of no decomposition of the peroxidic groups and the stability of the copolymer.

EXAMPLE 2

500 g (110 parts by weight) of water, 7.5 g (1.66 parts by weight) of the mixture of sodium alkyl sulfonates having a hydrocarbon radical of $C_{12}H_{25}$ to $C_{18}H_{37}$, 1.90 g (0.42 part by weight) of borax ($Na_2B_4O_7.10\ H_2O$) are mixed in a reaction vessel thermostated at 20° C. and provided with a stirrer, a reflux condenser, and an inert gas feeding tube.

Upon dissolution of the emulsifier and borax, the first portion of butyl acrylate of 180 g (20 parts by weight) is introduced, under stirring into the reactor, followed by emulsifying and purging the reaction mixture with an inert gas for 10 minutes. The reactor is then charged with the initiating system containing 2.45 g (0.27 part by weight) of potassium persulfate and 1.21 g (0.13 part by weight) of sodium metabisulfite, the reaction being carried out for 1 hour in a flow of the inert gas, whereupon the second portion of butyl acrylate of 180 g (20 parts by weight) is added.

In two hours from the start of the reaction, the third portion of butyl acrylate of 180 g (20 parts by weight) is introduced, and in three hours, the fourth portion of 180 g (20 parts by weight) is added. In four hours from the start of the reaction, upon 90% conversion of the butyl acrylate introduced, 90 g (10 parts by weight) of butyl acrylate and 90 g (10 parts by weight) of 1-methacrylate-1-tert-butyl peroxy ethane are introduced. In five hours the synthesis is completed.

The resulting latex has the following characteristics:

dry residue 45% of the latex mass
average particle diameter 0.20 μm
content of the peroxidic monomer units in the copolymer 9.6% by weight.

When storing the copolymer latex at room temperature for 30 days, no change in the content of active oxygen occurs.

EXAMPLE 3

Both the charge volume and order of introducing the first four portions (180 g each) of butyl acrylate are similar to those indicated in Example 2.

In four hours from the start of the reaction, upon 100% conversion of the butyl acrylate charged, and then in 4.5 hours, 5 hours and 5.5 hours from the start of reaction, in succession four portions (45 g i.e. 5 parts by weight each) of 1-methacrylate-1-tert-butyl peroxy ethane are introduced. In 7 hours the synthesis is completed.

The latex thus produced has the following characteristics:
dry residue 43% of the latex mass
average particle diameter 0.25 μm
content of the peroxidic monomer units in the copolymer 18.6% by weight When storing the copolymer latex at room temperature no change in the content of active oxygen occurs.

EXAMPLE 4 (CONTROL)

The synthesis of a latex of the copolymer of butyl acrylate and 1-methacrylate-1-tert-butyl peroxy ethane is carried out using the following initiating redox system consisting of isopropyl benzene hydroperoxide, Rongalite ®, Trilon B ®, the total mass of butyl acrylate and 1-methacrylate-1-tert-butyl peroxy ethane being introduced at a time.

Formula for preparing the latex:
butyl acrylate 330 g (90 parts by weight)
i-methacrylate-i-tert-butyl peroxyethane 33 g (10 parts by weight)
isopropylbenzene hydroperoxide 0.26 g (0.8 part by weight)
Rongalite ® 0.333 g (0.10 part by weight)
Trilon B ® 0.033 g (0.01 part by weight)
alkyl sulfonate 4.99 g (1.5 parts by weight)
water 666 g (200 parts by weight)

The temperature of the reaction mixture increases up to 60° C. during the synthesis process.

The latex thus produced has the following characteristics:
dry residue 33% of the latex mass
average particle diameter 0.06 μm
content of the peroxidic monomer units in the rubber 7.5% by weight.

When storing the latex at room temperature, the content of the peroxidic monomer units free of decomposition is lowered to 6.0% by weight in 30 days, to 4.1% by weight in 90 days, which evidences a low stability of the copolymer latex with regard to storage.

INDUSTRIAL APPLICABILITY

Thus, the proposed method makes it possible to improve the process for producing latices of reactive butyl acrylate rubbers, enables maximum preservation of the groups in the rubber when synthesizing and storing the latex, ensures adjustment of the latex particle size over a wide range (0.05–0.25 μm) and makes it possible to concentrate the peroxidic groups in the surface zone of the rubber particles, which results in an increased efficiency in grafting vinyl monomers on rubber.

The proposed latices can be used to best advantage, for example, in the synthesis of weather-resistant ABS-plastics due to the decreased latex volume as a result of high content of the peroxidic units in the rubber, which results in considerable saving in the initial material.

We claim:

1. A method for producing latices of copolymers of butyl acrylate and 1-methacrylate-1-tert-butyl peroxy ethane by emulsion copolymerization of butyl acrylate and 1-methacrylate-1-tert-butyl peroxy ethane in the presence of an initiating redox system, characterized in that the copolymerization is carried out through prepolymerization of butyl acrylate up to a conversion degree of 90–100% followed by introduction of 1-methacrylate-1-tert-butyl peroxy ethane into the reaction mass, potassium persulfate and sodium metabisulfite being used as the initiating redox system.

2. A method according to claim 1, characterized in that the initial materials are introduced portion-wise.

* * * * *